Figure 3:
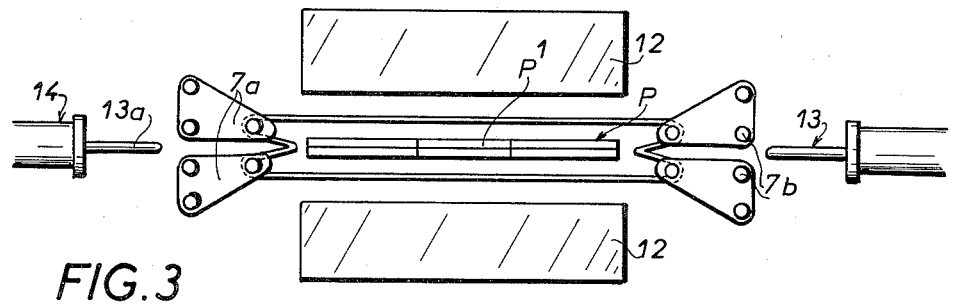

United States Patent [19]
Simon

[11] 3,910,167
[45] Oct. 7, 1975

[54] MACHINE FOR PLACING AND WELDING HANDLES ON PLASTIC BAGS

[76] Inventor: Roger Simon, 25 rue Pointe Cadet, 42000 Saint Etienne, Loire, France

[22] Filed: Sept. 27, 1973

[21] Appl. No.: 401,432

[30] Foreign Application Priority Data
Oct. 4, 1972 France .............................. 72.35887

[52] U.S. Cl. ............................... 93/8 WA; 93/35 H
[51] Int. Cl.² ............................................ B31B 1/86
[58] Field of Search .................... 425/394, 397, 406; 264/248, 173, 150; 93/8 WA, 35 H, 36.7, DIG. 1, 8 R; 53/134

[56] References Cited
UNITED STATES PATENTS

| | | | |
|---|---|---|---|
| 2,689,506 | 9/1954 | Bagnall ............................ | 93/8 WA |
| 2,883,913 | 4/1959 | Piazze ............................. | 93/8 WA |
| 3,162,895 | 12/1964 | Pusch ............................... | 425/394 |
| 3,183,291 | 5/1965 | Miller et al. ....................... | 425/394 |
| 3,266,053 | 8/1966 | Rochla ............................. | 93/8 WA |
| 3,384,928 | 5/1968 | Boeker ............................. | 425/406 |
| 3,417,675 | 12/1968 | Ausnit .............................. | 264/150 |
| 3,571,847 | 3/1971 | Palmal ............................. | 425/397 |
| 3,640,187 | 2/1972 | Mundus .......................... | 93/35 H X |
| 3,698,289 | 10/1972 | Kamins et al. .................... | 93/8 WA |
| 3,709,967 | 1/1973 | Held, Jr. .......................... | 264/248 |
| 3,748,214 | 7/1973 | Withers ............................ | 264/248 |
| 3,827,928 | 8/1974 | Van De Gent ................ | 93/8 WA X |

Primary Examiner—Granville Y. Custer, Jr.
Assistant Examiner—James F. Coan
Attorney, Agent, or Firm—Waters, Schwartz & Nissen

[57] ABSTRACT

A machine for welding handles on plastic bags comprising a pushing mechanism for pushing individual handles with their uppermost edge forward to a pivotal gripper which grips each handle and pivots the same downwardly to position the handle between displaceable welding electrodes. An opening mechanism is disposed at the level of the electrodes and serves for holding a plastic bag therebetween to open the mouth of the bag and permit the lower edge of the handle to pass thereinto. The electrodes are then moved together to clamp the handle between the uppermost edges of the bag to effect welding of the edges to the handle. When the bag has gussets a pair of displaceable rods are disposed at opposite sides of the bag and move inwardly to tuck in the gussets in the bag when the opening mechanism has returned to its initial position and the bag mouth is closed.

11 Claims, 9 Drawing Figures

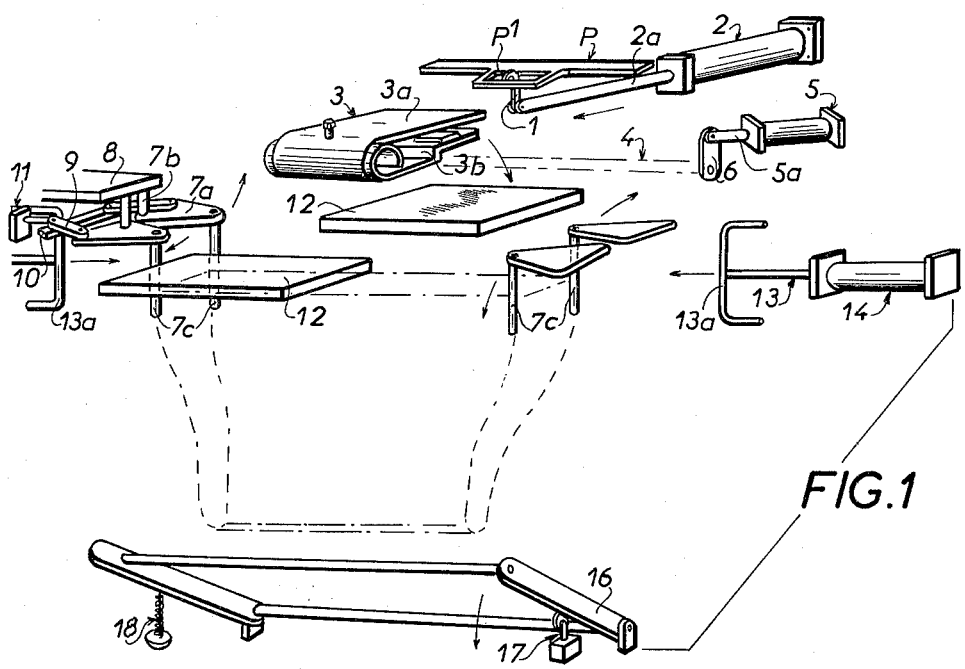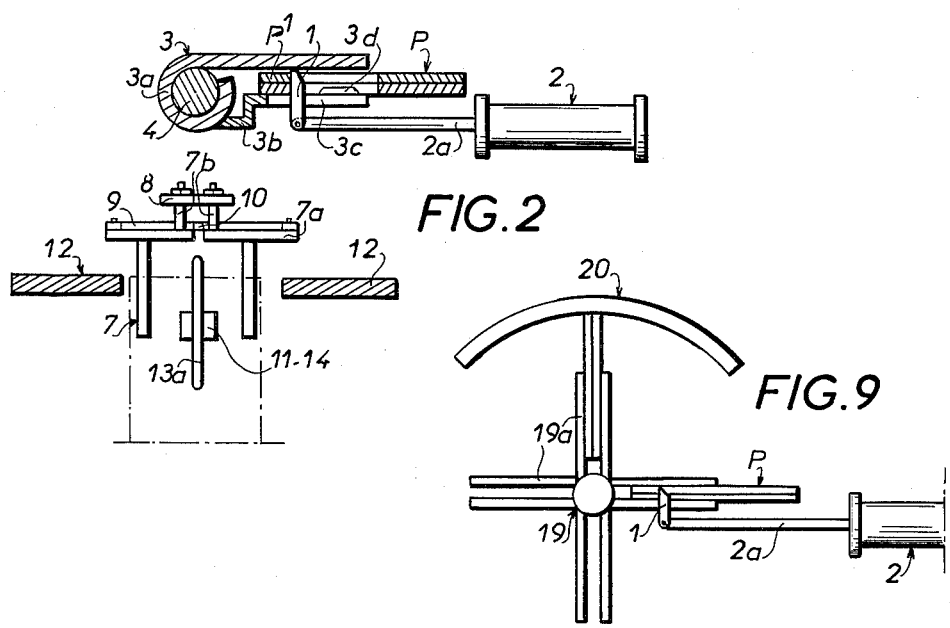

MACHINE FOR PLACING AND WELDING HANDLES ON PLASTIC BAGS

This invention relates to a machine for placing and welding handles on plastic bags. The bags may or may not be provided with gussets.

According to the invention there is provided a machine for placing and welding handles on plastic bags, comprising a feeding mechanism for feeding the handles upside down to a pushing mechanism which pushes individual handles with the uppermost edge forward towards a gripper which grips each handle and pivots downwardly to present it between welding electrodes, there also being provided an opening mechanism whereby a plastic bag placed therein may be opened at the mouth and have the mouth placed at the same level and embracing the lower edge of the handle, and between the welding electrodes, movement of the electrodes clamping the handle between the uppermost edges of the bag, whereby the edges are welded to the handle.

According to a feature of a preferred embodiment of the present invention, there is provided a machine as described above, and including a pair of pistons having ends profiled in the form of bow-shaped members and disposed coaxially and opposite each other on an axis passing between the electrodes and at right-angles thereto, whereby actuation of the piston causes the bow-shaped members to pass between the openers and to fold or tuck a gusset at each side of a bag placed therein.

According to a further feature of a preferred embodiment according to the invention, the handle gripper comprises two limbs radially extending from a rotatable drive spindle, one limb being fixed thereto and the other being resiliently urged towards the first.

According to a still further feature of the invention, means for controlling the handle feed, handle gripping and pivoting, opener positioning, welding electrode jaw operating movement and traversing movement of the gusset tuckers are controlled by an electrical, hydraulic and pneumatic apparatus actuated by the foot of an operator, who also places plastic bags in the openers.

Figure 4:
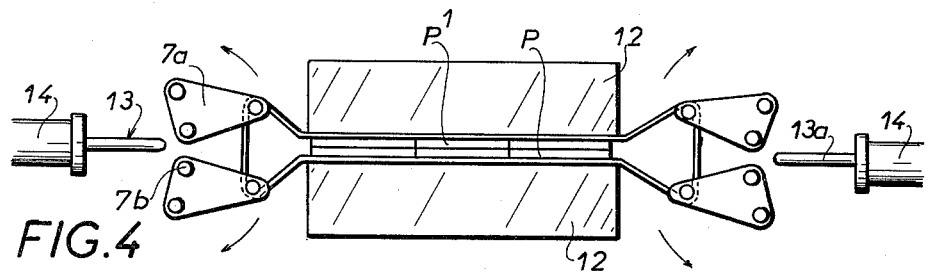
Figure 5:
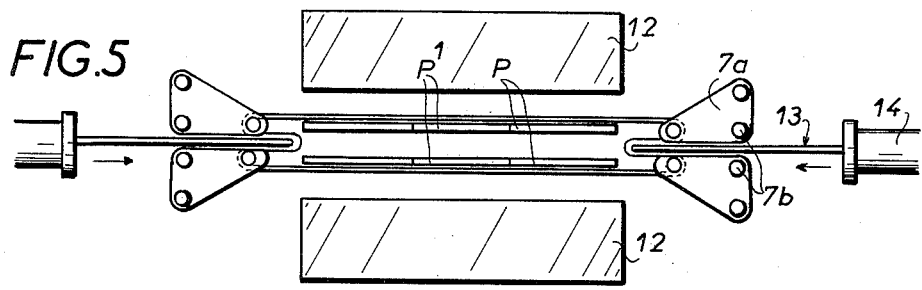
Figure 6:
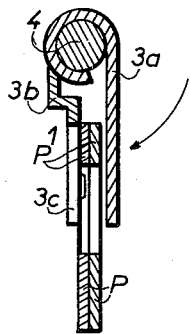
Figure 7:
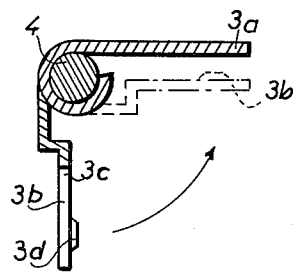
Figure 8:
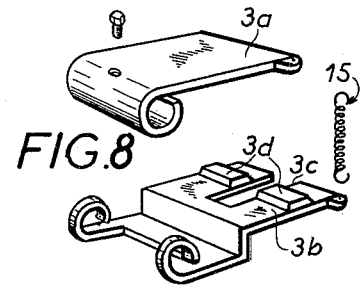

For a better understanding of the invention, and to show how the same may be carried into effect, reference will now be directed, by way of example, to the accompanying drawings, in which:

FIG. 1 is a diagrammatic perspective view showing the various elements of a machine according to the invention, FIG. 2 is a diagrammatic sectional view of the apparatus of FIG. 1, FIGS. 3 to 5 are diagrammatic plan views showing the stages of operation of the machine of FIG. 1, FIGS. 6 and 7 are sections showing a handle gripper and its method of operation, FIG. 8 is a perspective view of one embodiment of a gripper, and FIG. 9 is a side view of another embodiment of gripper for use in a machine according to the invention.

Referring to FIGS. 1 and 2 of the drawings, handles for welding to plastic bags are stored in a magazine or feeder formed by arcuate guides on which the handles rest, upside down, so that the lower edge of the bottom handle may be moved by a finger across a surface towards a gripper. The handle moves across the surface on its side with the upper part leading. The gripper clamps the handle and then pivots downwardly through 90° to present the lower part of the handle level with a bag previously placed in openers which stretch the bag and open out the mouth thereof, opening out side gussets if the bag is provided with them. Electrodes effect the welding of the handles to the bag and the gripper ejects the bag fitted with the handles and returns to its initial position to receive a new handle pushed by the finger.

The devices for tucking in the bag gussets after welding of the handles operate by means of rollers or guides which tuck in the gussets when the bags, equipped with their handles, are ejected.

One of the objects of the invention is to improve these gusset tucking-in devices and other components of the machine.

According to one embodiment and referring to the drawings, handles P for welding to plastic bags arrive from a feeder (not shown) and are placed on a horizontal support, each handle being pushed with its top part $p^1$ leading, by a finger 1 which is pivotably mounted on a rod 2a which is reciprocated by any suitable system, which is, in this embodiment, a jack 2. The finger 1 is rotated rearwardly as far as it will extend and pushes the handle towards a gripper 3 which clamps it between two limbs 3a and 3b.

The gripper is formed, in this embodiment, by one limb 3a which is secured substantially radially to a rotatable spindle 4, and another limb 3b rotatably mounted relative to that spindle. A slot 3c is formed in at least one of the limbs, or both of them, to allow the finger 1 to pass therethrough, and projections 3d are formed on the limb 3b on either side of the slot (see FIG. 8) and on that side of the limb 3b that faces the limb 3a, the projections 3d being shaped to allow a handle to pass thereover and then retain it in the gripper on withdrawal of the finger 1, the withdrawal being allowed by rotation of the finger against the action of suitable resilient means when the jack 2 is retracted.

When the handle is in position in the gripper and the finger has been withdrawn, the gripper is caused to pivot downwardly 90° about its axis by any suitable means, such as a jack 5 actuating a piston rod 5a which reciprocates a crank 6 secured to the spindle 4.

The handle is then suspended vertically (FIG. 6) and has its lower edge level with and inside the top edges of a bag which has been previously put into position by an operator on openers 7 intended to hold the bag and to open its mouth. The bag may have side gussets.

Each pair of openers comprises two plates 7a articulated on fixed points 7b on supports 8 which can be longitudinally adjusted so that vertical rods 7c borne by the plates and adapted to hold a bag open can adjust to any width of bag.

Opening of the plates and hence parting of the rods 7c can be effected in various ways. In FIG. 1, links 9 articulated to the plates and to a connecting arm 10 which is connected to the rod of a jack 11 are used for this purpose. Of course, the three points of the plate mentioned above (the axes of rods 7c, the axes of rotation 7b and the points of articulation of the links) are formed in a triangle to provide the pivoting movement.

When a bag has been placed on the openers and the handles situated inside the bag (FIG. 3) the openers pivot and open out the gussets or non-gusseted sides, and a pair of electrodes 12 draw together and weld the handle, one half to each edge of the bag (FIG. 4). Each handle P is split down the middle to allow the bag to be opened, in the normal way. After a set time of electrode application, the electrodes move apart and the openers return to their initial positions while a pair of gusset tucker devices operate (FIG. 5). These devices are, in this embodiment, formed by a pair of rods 13 which are located on an axis that passes between the electrodes and is perpendicular thereto. On the inner ends of the rods 13 are secured bowed members 13*a* of considerable length, to push the gussets in over a considerable part of the side of the bag. Each rod 13 is controlled by any suitable means, such as the jacks 14 shown in the Figures.

After return of the openers to the initial position, the bag is held only by the gripper, which is actuated so that its limb 3*a* returns to its initial position (FIG. 7), while the other limb 3*b* remains stationary. The bag then drops away, allowing the limb 3*b* to return to its initial position by the action of resilient return means 15 shown in FIG. 8.

The various movements of the components intended for placing and welding the handles on the bags are controlled automatically by electrical means controlling the operation of said components.

Apart from the conventional controls (including a main contactor), the operator using the machine has available a pedal 16 suitably articulated to the frame and controlling the handle pusher jack 2 by abutment against a contactor 17. When a handle is in place in the gripper, a contactor controls the clamping of the gripper and withdrawal of the pusher finger. Another or the same electrical element then controls the jack 5 to rotate the gripper and then, when the bag is positioned on the openers, the operative depresses the pedal further, to cooperate with another actuator or abutment on the contactor 17, which may have two controls. This contactor or a further contactor controls the pivoting of the openers and the movement of the electrodes for the welding of the handles to the bag. A time switch controls the cooling time which operates during the pressure of the electrodes, the current through which being switched off after welding. Finally, one or more contactors connected to the time switch control jointly the movement apart of the electrodes, the return of the openers and the advance of the devices for tucking in the gussets (where applicable).

The operator then releases the pedal which then automatically returns to its initial position by any suitable means, for example, spring 18.

When the bag when its handles has been ejected the gusset tuckers withdraw, the gripper returns to the initial position and receives a new handle supplied by the finger 1 after further actuation of the pedal 16.

In another embodiment, illustrated in FIG. 9, the handle gripper may be replaced by a rotary distributor 19 formed by a plurality of grippers 19*a* (for example four), whereby a handle can be fed to a gripper while another gripper presents a handle for welding. This arrangement ensures smoother operation and improved output. A guide 20 constructed in any suitable manner also enables the very long handles engaged by the grippers to be suitably oriented, in the event of the handles moving in the wrong way.

The advantages of the machine described are high speed and convenience of handle welding by the automatic system, the possible output being between 600 and 800 welds per hour for gusset-type bags and 1,500 to 1,800 welds per hour for bags without gussets. The method of presenting the handles to the grippers ensures that each handle is reliably gripped, irrespective of possible deformation of the handle. A further advantage is the ease of locating and welding the handle right into the gussets.

What I claim is:

1. A machine for placing and welding handles on plastic bags, comprising a pushing mechanism for pushing individual handles horizontally with their uppermost edge forward, a pivotal gripper positioned to receive each handle, means for pivoting said gripper about a horizontal axis downwardly with the handle therewithin so that the handle depends downwardly from the gripper, displaceable welding electrodes spaced horizontally from one another and positioned beneath the gripper to receive the handle therebetween, means including an opening mechanism for receiving a plastic bag and for opening the mouth thereof at a level between the welding electrodes, the horizontal pivoting axis of the gripper being above the opening mechanism and directly above the open mouth of the bag in said opening mechanism such that the lower edge of the depending handle will be embraced by the open mouth of the bag and means for moving the electrodes horizontally towards one another to clamp the handle between the uppermost edges of the bag to effect welding of said edges to the handles.

2. A machine as claimed in claim 1 further comprising means for tucking in gussets in the bags after welding of the handles to the bags comprising a pair of rods located on an axis passing between the electrodes and perpendicular thereto, said rods having inward ends and including bow-shaped members on said ends extending adjacent the side of a bag placed in the opening mechanism, and means for moving said rods inwardly to tuck in the gussets in a bag when the opening mechanism has returned to an initial position and the bag mouth is closed.

3. A machine as claimed in claim 2 wherein said gripper comprises first and second limbs, said means for pivoting said gripper comprising a drive spindle connected to the first limb, said second limb being rotatably connected to said spindle and means resiliently urging said second limb towards said first limb.

4. A machine as claimed in claim 3, wherein said pushing mechanism includes a pusher finger, at least one of the limbs of the gripper having a slot for passage of said pusher finger, a jack for actuating the pusher finger to push handles to the gripper, internal projections on said gripper on either side of the slot to retain the handles after withdrawal of said finger, and resilient means connecting said finger to the jack.

5. A machine as claimed in claim 4 wherein said opening mechanism comprises two pivotal plates each having three connection points disposed in a triangle, one of which points is a pivot axis connected to a longitudinally movable support, a bag opening and retaining rod connected to each plate at a second point and a link connected to each plate at a third point, and actuating means coupled to the links of the plates for jointly pivoting the same.

6. A machine as claimed in claim 4 comprising a crank secured to said drive spindle of the gripper and an actuator jack connected to said crank.

7. A machine as claimed in claim 5 further comprising operator-controlled means for operating said jacks and including a pedal, a contactor operated by said pedal to actuate the first said jack and move said finger to push a handle into the gripper, which then closes while the finger withdraws, and a second contactor which controls the means for pivoting the gripper, the opening mechanism and the means for moving the electrodes to weld the bag to the handles, said electrodes being opened and the plates of the opening mechanism returning to their initial positions after welding is finished and means for tucking in gussets in the bag, said means for pivoting said gripper comprising a gripper jack coupled to said first limb to pivot the same to release the bag, which, when released, allows the second limb to move towards the first limb under the action of said resilient means to receive the next handle.

8. A machine as claimed in claim 1 comprising a distributor for said handles comprising a rotary member having a plurality of grippers thereon such that when one gripper receives a handle, another gripper is introduced between the electrodes.

9. A machine as claimed in claim 1 wherein said handles are in the form of a loop, said pushing mechanism including a finger which enters the handle loop and displaces the same horizontally.

10. A machine as claimed in claim 1, wherein said opening mechanism includes a pair of pivotal elements engagable within the mouth of the bag at opposite ends thereof for opening said mouth with the bag hanging vertically.

11. A machine as claimed in claim 10 further comprising rods for tucking in gussets in the bags after welding of the handles to the bags, each said rod being displaceable between a corresponding pair of said pivotal elements engaged in the mouth of the bag.

* * * * *